June 17, 1947.  C. CHILOWSKY  2,422,337
SUBMARINE DETECTING BUOY
Filed April 15, 1941   4 Sheets-Sheet 4

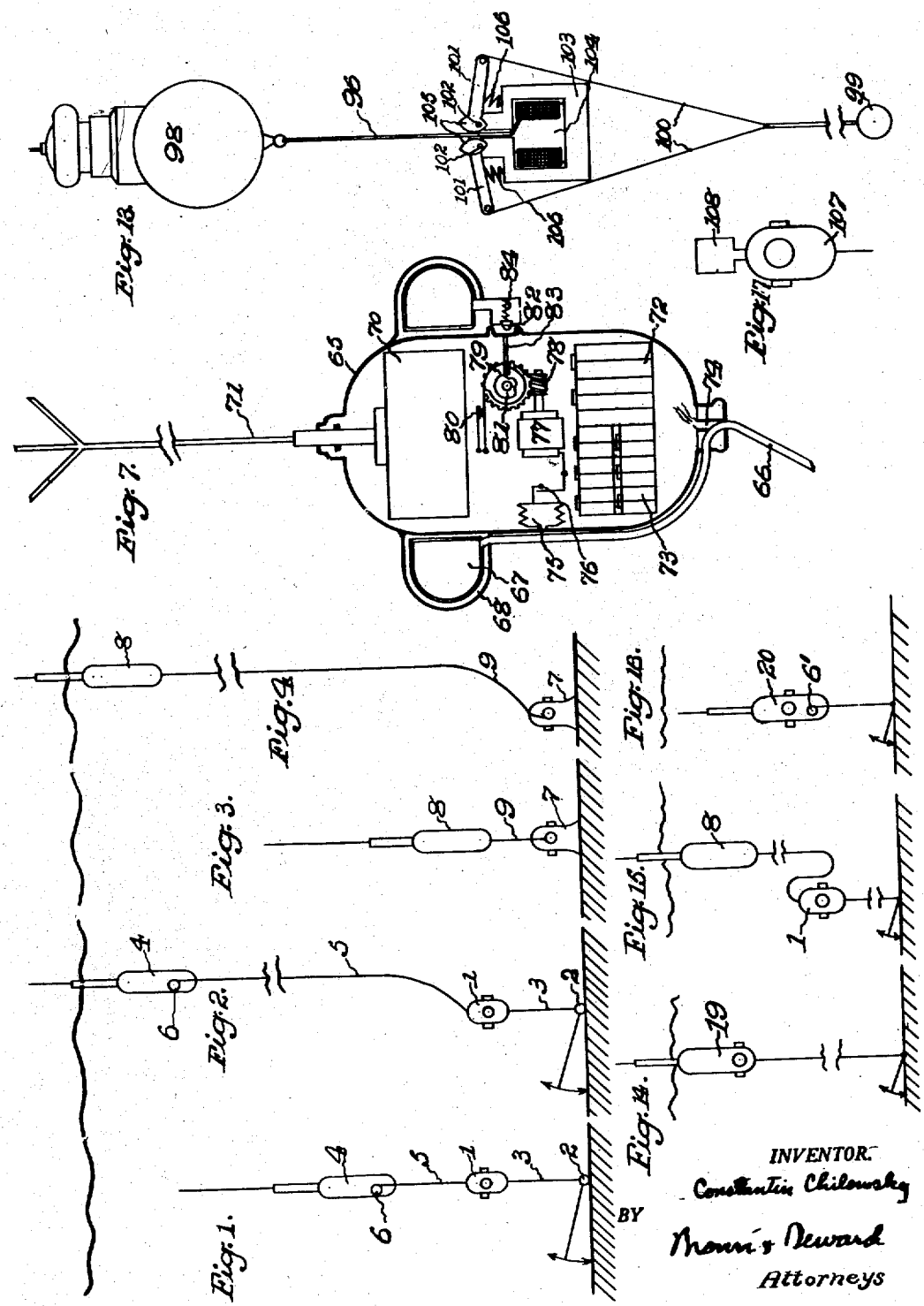

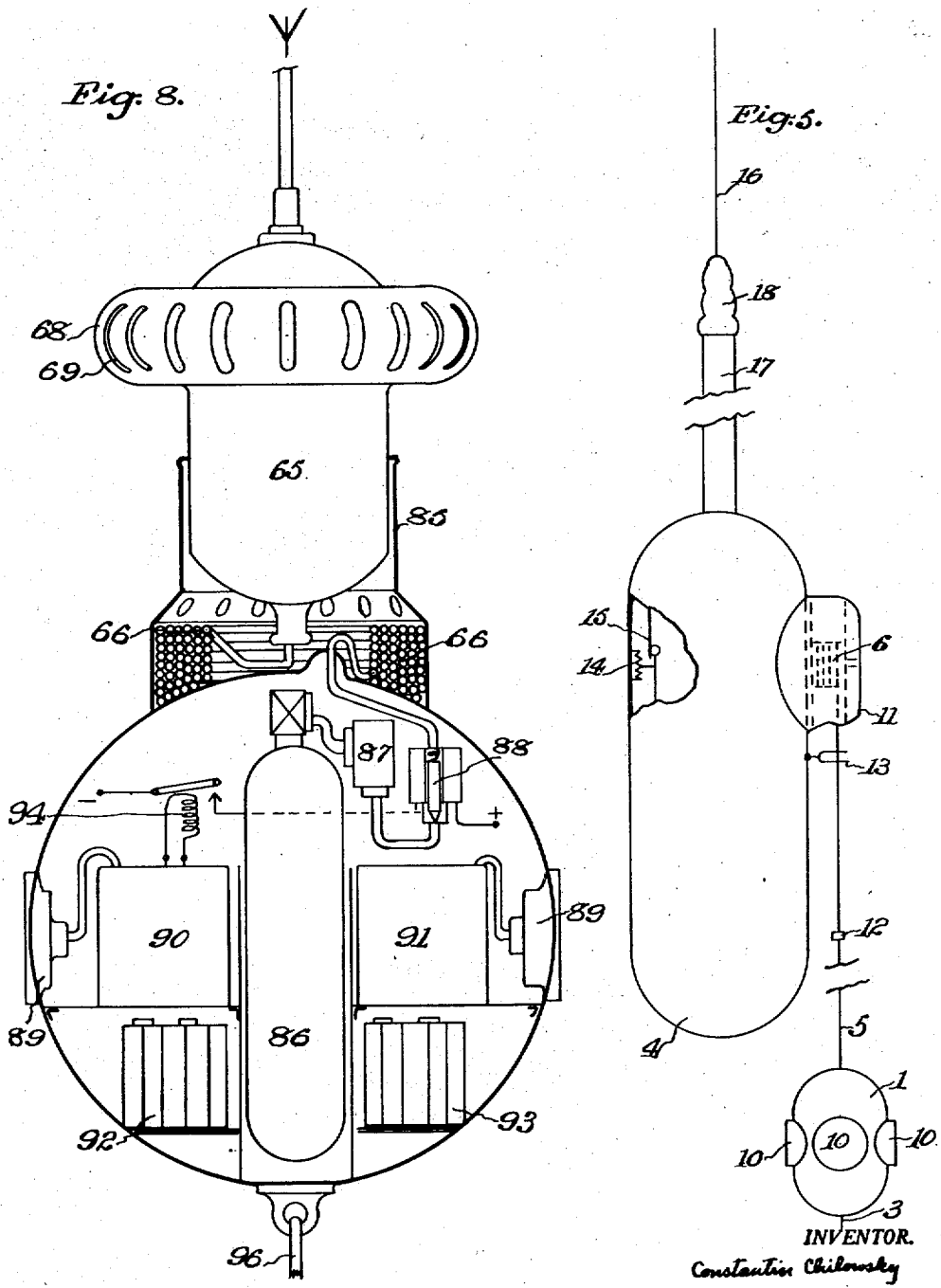

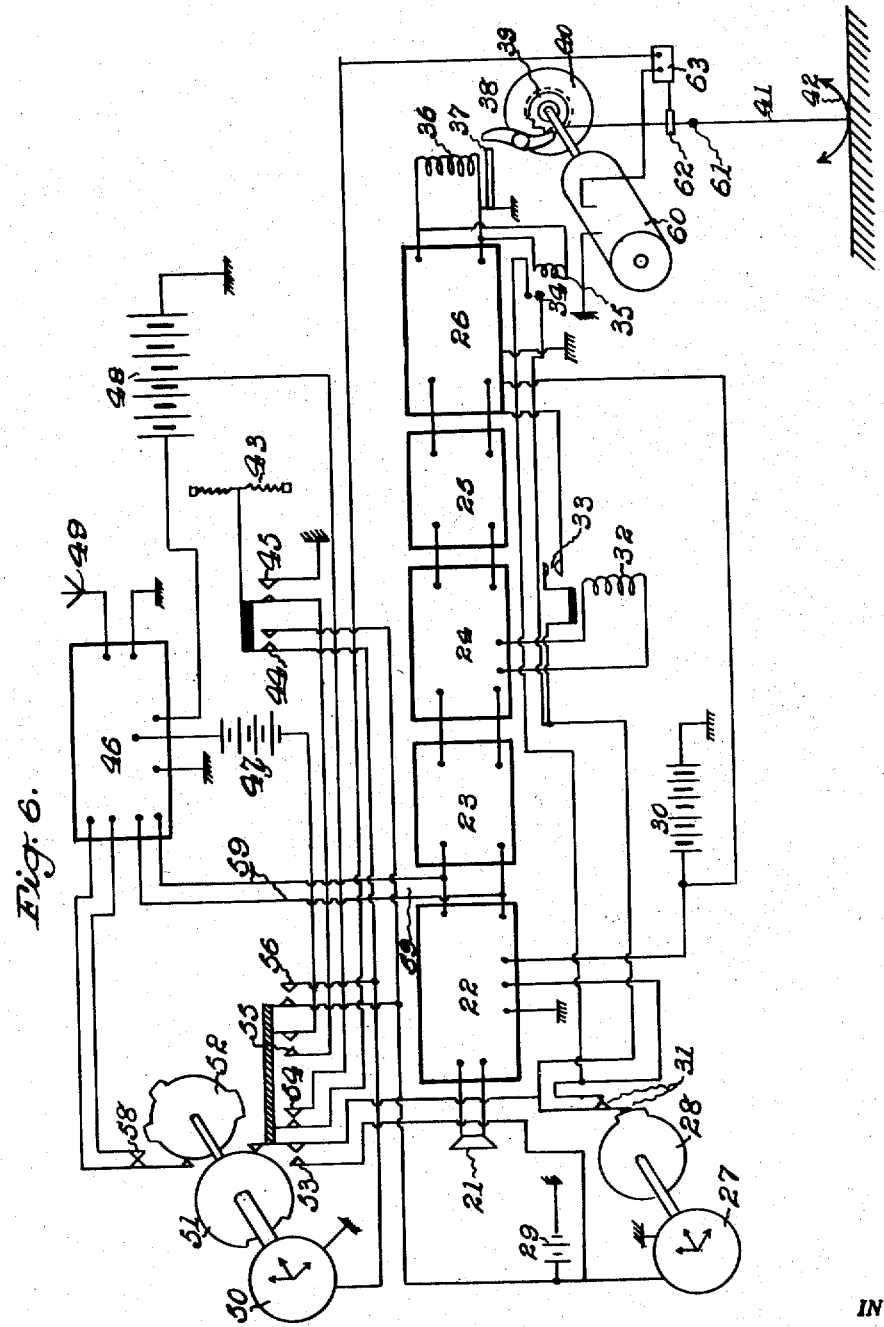

INVENTOR.
Constantin Chilowsky
BY
Brown & Seward
Attorneys

Patented June 17, 1947

UNITED STATES PATENT OFFICE 2,422,337

SUBMARINE DETECTING BUOY

Constantin Chilowsky, New York, N. Y.

Application April 15, 1941, Serial No. 388,616
In France April 19, 1940

10 Claims. (Cl. 177—386)

This invention relates to a system of maritime control, for the protection of coastal and other waters from invasion by hostile ships, through the establishment of automatic submarine observation posts adapted to give immediate warning of the approach of such ships.

The present invention permits, by means exceedingly simple and sure, the accomplishment of a very efficacious control over vast stretches of ocean—this control being affected neither by inclement weather nor by interference from the enemy.

In carrying out this invention an entirely automatic and autonomous submarine listening post is set up, being securely anchored and maintained either on the bottom of the sea, or (where the sea is too deep) at a suitable depth, and beyond the reach of any normal dragging operations by the enemy.

This post carries out submarine acoustic listening to sonorous and ultrasonorous vibrations issuing from the ship or its propeller, the observation being continuous and under particularly favorable conditions (sheltered from the surface noises of the sea), and reveals automatically the approach within a radius of one to several kilometers (depending on the type of the post) of any surface vessel or submarine, whether submerged or not. Such an approach "excites" the post and, as a consequence, causes the rise to the surface of the sea of the whole or part of the post equipped with a short-wave radio transmitter.

This transmitter, equipped with a small antenna which emerges above the surface of the sea, sends out a call of short duration, following which it sinks back automatically to its point of anchorage to which it has remained continuously connected by means of a cable.

The short-wave signal thus sent out will be an individual signal peculiar to this post, permitting the recording or control stations—even if they are several hundred kilometers distant—to identify it. It will thus be easy for these recording stations to locate accurately the spot where the warning originated and consequently the position of the ship which caused it since the exact location of each such post will be carefully noted at the time it is set up.

The transmitted signal will also permit reproducing accurately the noise made by the propeller of the vessel which cause the alarm, so that the nature of these noises will enable the distant control stations to determine the character or type of the vessel causing the alarm.

As the listening post is preferably provided with a safety device preventing any false alarm, and as the distant receiving stations are assumed to have at their disposal information on friendly and neutral navigation in their respective zones, the presence and position of enemy surface or submarine craft can immediately be determined. The necessary measures can then be taken, including, in the particular case of submarines, a quick verification by airplane. Vessels suitable to hunt down submarines (torpedo boats, subchasers, mosquito boats, etc.) can immediately be advised and sent out to the area where the submarine has been located, to find and destroy it.

Barrages of considerable length and width can be set up by means of a very limited number of posts, each of them being separated from the next one by a distance, for instance, of 3 to 10 kilometers, so that they can be set up in a very short time.

Such barrages will require for their installation a relatively restricted number of posts—a number incomparably smaller, for example, than that required by a mine field. Thus, a barrage line 600 kilometers long will require only 100 to 200 posts. The cost of such a post including its installation will be considerably less than that of a submarine mine; and each post will control the entire depth of the sea accessible to submarines.

These posts, and the barrages formed by them, represent—contrary to minefields—no direct and blind danger to friendly ships, which can in no way suffer from them.

Such barriers can prevent submarines from approaching the coasts, and minelayers from secretly planting mines. They can also be used to protect, on both sides, long maritime routes followed by ships and convoys.

In cases where the danger of dragging and detection of these posts by the enemy is not to be feared (for instance near friendly shores), the complete post can be maintained constantly at the sea surface, suitably anchored by a long cable, and with its transmission antenna constantly emerging from the sea.

Provision is made, in this and other cases, if desired, to attach the antenna to the post by a long tube and to so regulate the buoyancy of the whole, as to have only a part of said tube, with the antenna, emerge from the water, the post itself thus remaining relatively protected from the surface disturbances.

The listening post described herein will comprise, for instance, the following essential parts, contained in one or more watertight casings and able to resist the hydrostatic water pressure at considerable depths:

1. Apparatus for amplification of the electric currents generated by the listening devices with their supply batteries.

2. Apparatus for the control and filtering of the listener current, to eliminate all parasitic currents that are not caused by the sounds made by the ship or its propeller.

3. Electromechanical alarm mechanism, controlling, when actuated, the movement of the windlass containing the cable.

4. Short-wave transmitter with its supply batteries and antenna, this antenna protruding from the casing.

5. Chronometric and time mechanisms etc., regulating the timing of the various devices.

6. Manometric contact-making device controlling the sender.

Where at least a part of the post is to be alternately sent to the surface and drawn down out of sight there will also be provided a cable, with its windlass, attached on the outside of the casing, its axle passing through a stuffing box into the casing, and coupled to the electric motor operating the windlass.

The rise and descent of the post may also be effected, instead of by the rolling up and the unrolling of the cable, by varying the post's buoyancy. For instance, by causing the displacement to vary by means of an electric motor actuating a hydraulic piston; or by inflating or deflating a deformable chamber by means of a gas or liquid.

In the arrangement wherein part of the post is movable to or below the surface of the sea, electric current connection to the transmission set will be made, for instance, by means of a manometric membrane contact device, actuated by the decrease of water pressure with the approach of the transmitting unit to the sea surface. The depth at which the heating current will be sent into the transmitter's tubes will preferably be selected so as to have the filaments of the transmission tubes already heated when the post reaches the surface; a second manometric contact device being able to feed high-voltage current to the tube at the moment when the antenna emerges on the surface of the water.

The contact device will at the same time start a clock mechanism which will limit the transmission duration to the prescribed time and which will thereafter release the cable winding device for the descent of the apparatus, or effect, for the same purpose, a volume reduction of the mobile unit. There will be started also, with the beginning of transmission, the operation of the modulation device, insuring the transmission of the post's characteristic signal, and thereafter feeding of the listener currents to the modulation circuits of the transmission set, so as to insure the transmission of the detected sounds.

The observation posts are equipped with a continuously running electric clock; provision being made for changing from time to time, if necessary, the frequency of the transmission wave of that post or of a group of posts or of all posts in the network, in order to decrease in this way the danger of the enemy trying, in case of detection of this frequency, to blur the transmissions. These changes of frequency can be controlled by the posts' clocks by means of very slowly turning contacts operated by the clocks or by means of integrating meters which, at certain intervals, will change, by known means, the constants of the transmitting waves' oscillating circuits. These simultaneous frequency changes for a certain number of posts can take place at intervals determined in advance and consistent with the precision of the clock's timekeeping.

The detecting and transmitting post will, in general, be expected to remain under water for a considerable length of time (for instance, 1 to 2 years). It comprises tube amplifiers and a radio transmitter and must also be provided with the necessary power to enable the post to rise and to descend. As these observation posts must be absolutely self-contained, a great quantity of electric energy may have to be stored within the post itself, ordinarily by means of low and high voltage dry batteries.

In order to decrease the weight and size of these batteries and to extend the life of the tubes the amplifiers are operated only periodically by switching the electric current to them for very short time intervals, just sufficient to heat the filaments and produce the warning signal, so that most of the time the posts remain without current and inactive. While the radius of sensitivity of such a detector post can reasonably be several kilometers, the passage time of a submarine through the zone controlled by the post will be, for instance, of the order of several minutes. It will therefore be possible to switch the battery current to the amplifiers each time for 6 to 10 seconds, at regular intervals of one to two minutes, and reduce the weight and size of the batteries ten times or more.

As the wireless transmitter is operated and consumes current only in case a warning is to be sent out, i. e., rarely and also for very short periods of time, generally less than a minute, the electric energy that must be stored for the transmission will remain within reasonable limits. The same considerations apply to the power required to wind the cable or to modify the displacement of the post.

It is, of course, understood that to secure these various operations the post will be equipped with one or several clock mechanisms operated by the battery current. At least one of these mechanisms will be kept running during the whole life of the post, but need consume only a very small amount of current.

Provision can be made also to arrange that after each alarm, followed by the sending out of a warning, the post be made insensitive for a certain length of time (for instance 10 to 60 minutes), in order to prevent the same or another enemy ship (particularly, for instance, a trawler) from causing intentionally several alarms and ascents of the same post, so as to find its exact location and destroy it. The length of this period of complete inactivity will likewise be regulated by one of the clock mechanisms.

In an alternative arrangement, for certain special cases, e. g. of very important limited areas, the passive listeners for detecting the propeller sounds may be replaced by super-sonic transmitter-listener devices. These devices will transmit periodically, for instance every minute, short trains of super-sonic waves in the form of beams directed horizontally, with a sufficiently large cone opening. According to the known technique of super-sounds, the same devices will serve to receive the super-sonic echo, i. e. the return wave after the reflection of the super-sounds by an obstacle, such as the hull of a vessel, and most particularly of a submarine, at the time of its passage across the beam. The echo picked up by the device will generate electric currents which, after amplification and rectification, will actuate relays or electro-magnets, causing operation of the warning device as previously described. This system may properly be employed in cases where there may be a supposition that the submarine, feeling itself endangered, will slow down its speed to the utmost, creating the risk that the propeller noises will become too faint to be detected by simple listening.

Provision is also made, where the distances between the control stations and the observation posts are short, to utilize for signaling, not wireless transmission, but the transmission by the post of suitable under-water acoustic signals which will be picked up by the control stations by means of appropriate acoustic receivers.

In accordance with an alternative version, the invention makes provision for signaling by any accessory means, such, for instance, as exploding caps under water, shooting light, or smoke, or rockets, etc., which may either be heard through the water or seen on the surface.

In certain cases it may be useful to mark the spot of origin of the warning for the airplane or vessel sent to that spot, to enable them to locate easily the alarm zone. For this purpose, provision is made to cause the mobile unit to ascend, after a predetermined time interval, for a second time to the surface and to effect, during a limited time, a transmission which will enable a patrol vessel or airplane to locate, by means of a goniometer, the spot of origin of the initial warning. This may be achieved by means of the clock mechanisms actuating corresponding contact devices after each alarm. Otherwise, the vessels may be guided toward the observation post by means of a radio goniometer from shore.

For the same purpose, provision is made, by the same means of clock mechanisms and contact devices to cause the post to release, a certain time after each alarm, a smoke bomb, light signal or the like which will ascend to the surface and will, during a certain time, emit smoke or light.

It is also contemplated that, close to shore, the automatic observation posts may not be self-contained, and may be connected to coastal control stations by means of a submarine electric cable which will serve to transmit to the station, in case of alarm, the number of the warning post and the authentic sounds picked up, and which cable can also serve to supply current for the submarine post. In such non-independent, but automatic, post which will remain constantly under water, the ascending part and the short-wave transmitter will be eliminated, and the sounds picked up will be sent into the cable as amplified current. The post will retain, however, the electric time mechanism, with its functions of periodically supplying feeder current to the amplifiers, in order, particularly, to prolong their life, to economize current, etc.

A practical embodiment of the invention is shown in the drawings in which

Fig. 1 shows diagrammatically an observation post, with its listening and transmitting units immobile near the bottom of the sea in submerged position;

Fig. 2 shows the same post with its transmitting unit moved to sending position at the surface;

Fig. 3 shows an observation post divided into two units, the one immobile at the bottom, and the other mobile, in the position where the mobile unit is submerged;

Fig. 4 shows the same post in sending position where the mobile unit is at the surface;

Fig. 5 shows schematically a mobile wireless transmitter with windlass, the listening devices being immobilized at the bottom of the sea;

Fig. 6 shows a general wiring and assembly diagram of the complete observation post;

Fig. 7 represents a modified form of transmitting unit wherein the ascent and descent are accomplished through the inflation or deflation of a rubber tube;

Fig. 8 represents a complete two-piece observation post ready for planting, the unit shown in Fig. 7 being housed in the top of a listening unit which is intended to remain relatively immobile;

Fig. 13 represents a brake and anchor device adapted particularly for use with the post shown in Figs. 7 and 8;

Fig. 14 represents a form of observation post in which all the operating parts are contained in a single unit intended to remain continuously at the surface of the sea;

Fig. 15 represents a form in which the listening and transmitting devices are in separate units, as in Figs. 1 to 4, the transmitting unit being intended to remain continuously at the surface;

Fig. 16 represents a single unit, such as that shown in Fig. 14, with the addition of means for moving it to submerged position except when it rises to the surface to send out a signal;

Fig. 17 represents a modified form of post which remains continuously submerged and sends out signals by acoustic means.

Figure 9:
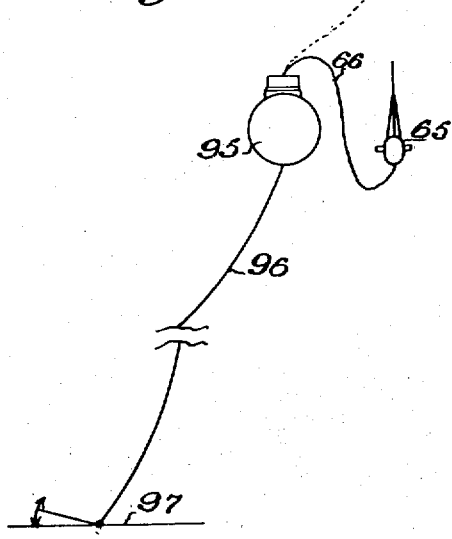
Fig. 9 represents, in a manner analogous to Figs. 1 to 4, an installation of the post shown in Figs. 7 and 8.

Referring to the drawings, Fig. 1 represents a form of the observation post, wherein the listening mechanism 1 is kept relatively immobile at a fixed distance from the point of anchorage 2, to which it is fastened by means of a constant-length cable 3, the listening device 1 being connected with movable transmitting unit 4 by an unwinding electric cable 5; 6 being the winding and unwinding pulley (for the cable 5), carried by the unit 4.

Fig. 2 shows the same arrangement with cable 5 unwound and the transmitting unit 4 in its position near the surface of the sea.

Fig. 3 represents an observation post divided into two parts, the listening unit 7 being immobile and resting, for instance, at the bottom of the sea, while the transmitting unit 8 is mobile, and when a warning is received will rise to the surface, as shown in Fig. 4, to send out the alarm. The units are connected to each other by an unwinding cable 9, which may be an electric conductor similar to the cable 5 in Figs. 1 and 2, or may simply serve as mechanical connecting link between the two units, in which case the two units are electrically independent. The first unit 7 will comprise the listeners, the amplifiers, the warning-release devices, the feeder batteries, as well as the pulley unwinding device, freed by the action of the warning mechanism. The second unit 8 will comprise the sending apparatus with its feeder batteries and, if necessary, independent listening devices, in case the transmission is modulated to transmit the sonorous listening signal.

In the case where the connecting cable between the two units 7 and 8 is an electric cable, the modulation of the transmission from the unit 8 takes place through this cable, coming from the motionless listeners of the listening unit 7.

Fig. 5 shows the general plane of a detecting and signaling post, such as that shown in Figs. 1 and 2, wherein the listening device 1 comprises the listeners 10 and is maintained near the bottom of the sea or at a certain depth by cable 3. This listening device is connected by cable 5 to a windlass 6 attached to the casing of the mobile unit 4 containing the whole of the warning system and of the radio-electric transmitter; 11 representing the protective casing of the windlass, forming part of the casing of the unit.

Collar 12 on the cable 5 serves, when coming into contact with fork 13, to stop the descent of the mobile unit 4, as will be further explained in connection with Fig. 6.

14 is a manometric chamber with an electric connection contact 15. It causes contact 15 to close when the unit 4 has approached the surface sufficiently for the antenna 16 to emerge into the air, and again opens the contact 15 as soon as the unit begins to descend. 17 is a protecting tube extending from the top of the unit 4 and having an outlet element 18 from which the transmission antenna 16 extends.

In Fig. 6, 21 is a microphone; 22 its amplifier; 23, the band filter intended to let pass only frequencies that can be caused by propellers; 24 is a detector with such amplification as may be desired; 25, a band filter for very low frequencies (approximately 5 to 20 cycles) corresponding to sound modulations caused by the rotating propeller blades; 26, an amplifier and rectifier of these low frequencies; 27, an electric clock mechanism; 28, a cam operated by said clock mechanism; 29, a feeder battery for operating the clock mechanisms 27 and 50 and for the heating of the tube filaments of amplifiers 22, 24 and 26. 30 is a battery serving to provide high-voltage current to amplifiers 22, 24 and 26; 31, is an electric connection contact, periodically closed by cam 28 and thus periodically causing current to be supplied to amplifiers 22, and 24; 32 and 33, a relay actuated by amplifier 24 and providing feeder current for amplifier 26; 34 and 35, a relay actuated by amplifier 26 and short-circuiting the contact 31, providing permanent current flow to the amplifiers 22, 24 and 26; 36—37, an electromagnet for releasing the cable-winding drum 40 by means of pawl 38 and ratchet 39. 41 is the cable and 42 is the anchor. 43 is a manometric membrane (shown diagrammatically at 14 in Fig. 5) actuating contacts 44 and 45; 44 being a contact for the starting of the electric clock mechanism 50 and 45 being a contact to start operation of the wireless transmitter 46. 47 is a battery providing current to heat the tubes of transmitter 46; 48, a high-voltage battery of transmitter 46; 49, the antenna of transmitter 46. 50 is an electric clock mechanism, operating cams 51 and 52; cam 51 completing a revolution, for instance, in approximately 10 minutes and operating contacts 53, 54, 55 and 56, while cam 52 completes a revolution, for instance, in one minute, operating contact 58; the contact 53 cutting off the electric current from amplifiers 22, 24 and 26 during, for instance, 10 minutes after the transmission of a warning signal, the contact 54 supplying current to motor 60 to wind up the cable after sending out the warning, the contact 55, in series with contact 45, cutting off the current from the transmitter after, for instance, one minute of operation at the moment when contact 54 starts the winding of the cable to submerge the unit, and contact 56, in parallel with contact 44, providing current flow to clock mechanism 50 after the submersion of the unit, and until the cutting off of the complete contact of cam 51 (approximately 10 minutes). Contact 58, operated by cam 52, serves to modulate transmitter 46 in conformance with a conventional signal peculiar to each individual observation post. Electric wires 59 carry the amplified microphone current for the modulation of the transmitter. The cable 41 has a collar or stop 61 (corresponding to the collar 12 in Fig. 5) attached to the cable at the desired distance from the anchor, this collar or stop serving to operate fork 62, which fork operates contact 63, to shut off the feeder current of motor 60 when the cable has been sufficiently wound up.

The operation of the system just described is as follows:

At rest, the post is submerged and the cable is therefore wound up on the drum 40.

Clock mechanism 50 is stopped in such a position that contacts 54 and 56 are open. Contacts 53 and 55 are closed. Contacts 44 and 45 are also open, due to the action of the water pressure on the membrane 43.

Clock movement 27, continuously operating, rotates cam 28 which closes periodically the contact 31, thus periodically supplying current to the amplifiers 22 and 24.

If the microphone catches a sound, the resulting current is amplified by 22. If the frequencies of that sound correspond to the frequency band of filter 23, the current passes through 24 where it is detected and amplified.

Relay 32 closes contact 33 and thus supplies current to amplifier 26.

If the sound caught by the microphone 21 is produced by a propeller, it is necessarily modulated by the beat of the blades of the rotating propeller. The current detected by 24 will therefore be a pulsating one. The alternating part of this pulsating current will pass through filter 25 and will be amplified by 26.

The current coming from 26 will actuate relay 35 which, by closing contact 34, will keep the whole listening system (21 to 26) operating, regardless of contact 31 which continues to be periodically opened and closed.

The release-relay 36 will free the cable, and the unit will rise to the surface.

If the microphone detects a sound, the frequencies of which do not correspond to the filter 23, 26 will not even get any current. If the sounds pass through 23, but are not modulated (i. e. sounds not caused by a propeller) the current detected by 24, will not be passed through filter 25 and no warning will be registered. Contact 31 will therefore continue to repeat periodically the closing of the listener current circuit, for instance every minute.

Therefore, only in case the sounds detected cause currents of frequencies passing through filter 23 and, moreover, are modulated by frequencies passing through filter 25, will amplifier 26 actuate relay 36, causing the unit to rise.

When the unit has risen, the manometric membrane 43 closes contacts 44 and 45. The first of these contacts (44) starts the clock mechanism 50. The second (45) causes current to flow to transmitter 46.

Transmitter 46 gets a modulation current from the microphone 21, amplified by 22 (through cables 59).

In addition, the transmitter receives and sends out conventional Morse signals or the like from cam 52, these signals serving as an identification of the particular observation post which is operating.

After approximately one minute of operation, cam 51:

(a) Cuts off the transmitter's feeder current (contact 55)

(b) Sends current to motor 60 (contact 54)

(c) Provides, through contact 56, current for clock mechanism 50, in spite of the immersion of the system, and, consequently, opening of contact 44

(d) And finally, by means of contact 53, stops for a predetermined period of time (for instance, 10 minutes) the supply of current to the listening system.

When the buoy has sunk to a sufficient depth (for instance, a short distance from the bottom) collar or stop 61, affixed to the cable, stops the current-flow to the cable-winding motor by means of fork 62 and contact 63.

Approximately 10 minutes after the end of the transmission, cam 51 opens the contacts 54 and 56, and closes the contacts 53 and 55; by this operation:

(a) Contact 53 restores the original situation where contact 31 is able to start the operation of the listening system.

(b) Contact 56 stops clock mechanism 50.

The whole apparatus is then back to the original starting position and the cycle can recommence, upon reception by the listening device of another propeller sound.

In an important modification, shown in Figs. 7, 8 and 9, the invention provides for the elimination of the winding and unwinding of the cable, the ascent and descent of the transmitting unit being effected by changes in its displacement in relation to the water; the length of the cable remaining constant and sufficiently great to permit the transmitting unit, from time to time, to either descend to a depth greater than that at which the listening unit is anchored, or to rise to the surface.

In this case special means are provided in order that the mobile unit may be enabled to freely follow the movement of the seas, at times mounting to the crest of a wave, at other descending into the trough, but remaining at all times at the surface, partially submerged and with the antenna entirely emerging from the water and consequently continuously able to make effective transmissions. It is particularly provided that the length of the cable or connection between the mobile and immobile units should be so much greater than the depth of the immobile unit below the surface that it permits the transmitting unit to be pulled away, as by a storm, during the time of transmission (when the unit is at the surface) without tending to put an undue strain on the cable or other connection. By thus extending the length of the cable, its size may be reduced to a minimum so that the observation post may be located at very considerable anchoring depths, if desired.

These results are obtained, in the form of device shown in Figs. 1 to 5, by winding on the cable-unwinding pulley a sufficient excess length of cable in relation to the distance to the sea-surface. In the modified arrangement where the unwinding is eliminated and the mobile transmitting unit ascends and descends by means of variation of the displacement, the cable length between the units will be considerably greater than the distance from the immobile unit to the surface of the sea.

Fig. 7 shows such a transmitting unit wherein the ascent and the descent are accomplished through the inflation or deflation of a rubber pouch or tube by means of a store of compressed gas; particularly a carbon dioxide flask, placed in the immobile part of the apparatus.

In this figure, 65 is the mobile part of the observation post, containing the transmitter, 66 is a rubber tube carrying the carbon dioxide gas to the rubber pouch or tube 67, having, for instance, the form of a pneumatic inner tube for tires and being protected on the outside by a casing 68, which is provided with orifices 69 (Fig. 8). The transmitter is represented diagrammatically at 70 and has a suitable antenna 71. 72 and 73 are feeder batteries for the transmitter; 74, an electric cable, preferably located inside tube 66, and serving to carry to the transmitter the modulation currents coming from the detectors, located in the immobile listening unit and transmitting the post's identification signal. 75 is the manometric chamber actuating contact 76 which, when the device has risen to the surface, starts a clock mechanism controlling an electric motor 77 with worm gear 78 to actuate a double cam, the larger periphery of which, 79, closes the contact 80 to start operation of the transmission for a predetermined period of time (generally less than a minute), while the smaller periphery 81 opens, after the end of the transmission, valve 82, by pushing outward the rod 83 and moving the valve against the pressure of a retaining spring 84, thus permitting the carbon dioxide gas to escape from the pouch 67, whereupon the unit sinks again under water. The rod 83 acts preferably against a resilient portion of the wall of the unit, but may also be arranged to pass through the wall.

Fig. 8 represents the complete post at the time it is being planted, before the separation of its mobile unit 65. This mobile unit is maintained within casing 85, inside which is located the rubber tube 66 which unrolls after separation of the units. 86 is the carbon dioxide flask, with the pressure regulator 87 and the electromagnetic valve 88 connected with rubber tube 66. 89 are the detectors or microphones, the currents of which are amplified and filtered by the filter circuits etc. schematically indicated by 90 and 91, corresponding to the devices shown and described in connection with Fig. 6, and 92, 93 are the feeder batteries. In case of alarm the relay 94 actuates valve 88, which permits the flow of the gas through tube 66 (which is assumed to be unrolled) into the rubber pouch 67.

Fig. 9 represents diagrammatically the whole of the observation post just described, consisting of the immobile unit 95, anchored at a fixed distance from the bottom by the thin steel cable 96, and the mobile unit 65, with the transmitter, connected with unit 95 by the tube 66, shown in its lowest submerged position. The location of the same unit when it has risen to the surface is indicated in broken lines. It will be seen that the cable of the mobile unit is not stretched, as its length (for instance 35 meters) is greater than the distance between the immobile unit 95 and the surface of the sea. The bottom of the sea is indicated at 97, and the distance between the unit 95 and the bottom may be as much as several kilometers.

When the ascent and descent of the mobile transmitting unit is caused by varying the displacement thereof, as shown and described in connection with Figs. 7, 8 and 9, the electrical system shown in Fig. 6 can, for the most part, still be used. Certain modifications which must, however, be made include the following: on leaving the current, instead of actuating the relay 36, 37 will operate the electromagnetic gas valve 88 (Fig. 8), opening it and thus supplying gas to the inflatable element 67 (Fig. 7) through the tube 66; the separate transmitting unit 65 will have its own low and high voltage current supply 72, 73, but will be connected to the immobile listening unit by the cable 74 carrying the modulation current of the listening device; the transmitting unit will also have its own cam mechanism 77—81 for modulating the transmission in accordance with the conventional identifying signal characteristic of the particular post; and the unit 65 will also have its own manometric contact control device 75, 76.

The admission of the proper quantity of gas into the inflatable chamber of the mobile unit to cause its rise to the surface can be effected by any suitable means already known. In particular provision is made to control by means of a time switch or one of the clock mechanisms the time interval during which the electromagnetic valve 88 stays open. Or a gas meter may be placed on the gas conduit just beyond the constant pressure gauge 87; this gas meter preferably being equipped with a reduction gear having an electric contact which, upon reaching a predetermined angular position, will cut off the electric current which holds open the valve 88. Or the regulation of the amount of gas may take place in the mobile unit 65, the gas flowing into the inflatable chamber until the unit has ascended a short but appreciable distance, such as 10 meters. At this depth a properly regulated manometric device will actuate a valve to shut off the further admission of gas into the chamber. If desired, it will also be possible to combine the gas regulating devices of both units in a single unit. It will be understood that a rapid discharge of gas from the chamber in order to effect the descent of the mobile unit may be aided by the natural elasticity of the rubber forming the chamber, and by locating the discharge valve at a point above the body of said chamber.

Figure 10:
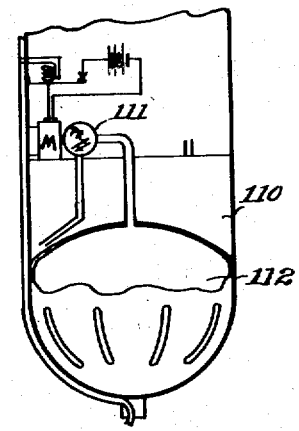
Fig. 10 represents an alternative means for varying the displacement of a unit such as shown in Fig. 7.

While a means for varying the displacement of the transmitting unit by supplying gas to an inflatable element has been disclosed in detail, it will also be understood that alternative arrangements could be provided. One such arrangement which may be found desirable is shown in Fig. 10 and includes the provision of a fluid supply tank 110 in the transmitting unit itself, together with a pump 111 for pumping the fluid into an inflatable or expansible element 112 in order to increase the displacement of the unit, the pump being operable in the reverse direction to return the fluid from said element 112 to its original position in the tank. The partial vacuum created inside the unit as the fluid is pumped out will have no detrimental effect upon the functioning of the apparatus, particularly if the manometric chamber is properly insulated to make it insensitive to pressure changes within the unit. A similar result could also be obtained by the use of pistons or the like which could be forced outward in order to increase the displacement and drawn inward to reduce it.

It is intended in case of great depths of anchorage of the post, to utilize anchoring cables of small diameter, for instance of the order of 1 mm.$^2$ of metal cross-section, made of high quality steel (such as that used, for instance, for balloons), having a break resistance of the order of 300 kg./mm.$^2$. The cable will be preferably protected by a thin protective layer, or it may be cadmiumized. The hydrostatic buoyancy force of the immobile under-water unit may be, for instance, 50 to 100 kg.

For an anchoring depth of some few thousand meters the possible deviation of the post from its vertical position and the consequent variation of its depth will generally remain within admissible limits allowing for normal water current speeds. But in the case of greater anchoring depths and/or higher under-water current speeds (and in general to improve the operation of the system), the listener unit may be maintained artificially at an approximately constant depth, independent of the anchorage depth and the current speed. This is achieved, as shown in Figs. 11 and 12, by adding to the listener buoy a windlass, carrying a reserve of anchorage cable sufficient to permit a considerable lateral deviation of the listener buoy without an increase of its depth, this windlass being operated, for instance, by an electric motor controlled by a manometric contact device or the like.

Figure 11:
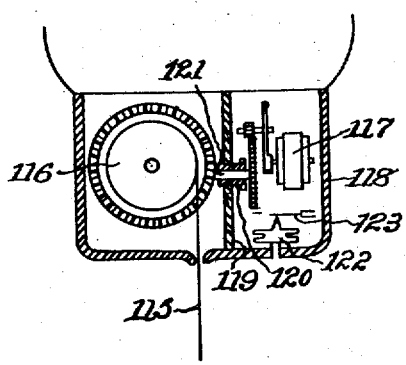
Fig. 11 represents an automatic cable control mechanism for maintaining the listening unit at a selected optimum depth.

In Fig. 11, 115 is the anchoring cable; 116 the winding drum of the windlass connected by conical and reduction gearing to the electric motor 117. The case 118 secured to the lower part of the immobile unit, is divided by the partition 119 into two parts; the left one, containing the drum, is open to the water; 120 is a water-tight stuffing-box, set in the partition to permit passage of the axle 121. The right-hand compartment contains the operating apparatus including the manometric device 122, operating a contact device 123, which controls the motor.

Figure 12:
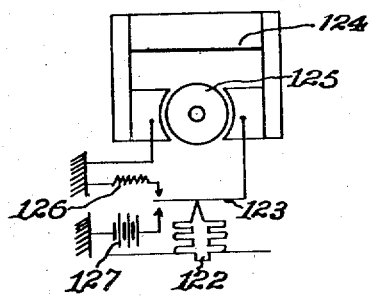
Fig. 12 represents a detail of the wiring and other mechanism shown in Fig. 11.

In Fig. 12, 124 is a D. C. motor with excitation by a constant magnet of aluminum alloy. If the unit, made to deviate by the currents, descends too far, the manometric device 122 pushes the bar of the contact device 123 upward and closes the rotor 125 of the motor over the resistance 126 while the cable unrolls slowly, causing the motor to act as brake. Contrariwise, if the cable approaches the vertical, the unit will rise, the hydraulic pressure decreases, the bar of the contact device is lowered and closes the circuit through battery 127 and the motor, which then slowly winds up the cable, until the post descends to the desired depth. Suitable means may be provided for maintaining the contacts in a neutral position.

Fig. 13 shows schematically the complete observation post as it is first placed in the water, equipped with a pilot and brake device for automatically regulating the depth of the immobile unit below the surface of the water, regardless of the total depth thereof. In this figure the complete observation post as shown in detail in Fig. 8 is indicated diagrammatically at 98. The pilot, braking and anchoring means comprise a relatively small pilot weight 99 secured by a bridle 100 to the ends of brake levers 101, 101. These brake levers are pivotally mounted at 102, 102 adjacent the upper end of a heavy anchoring casing 103 having a compartment 104 within which is coiled a sufficient length of the cable 96 to extend from the post 98 to the bottom of the sea when the post is located at a selected depth below the surface of the sea. The cable 96, where it emerges from the compartment 104, passes between the gripping surfaces 105 at the inner ends of the levers 101, 101, and the levers are normally urged upward into braking position by the springs 106, 106. The bridle 100, with extensions thereof, is made of a length such that the weight 99 is spaced below the casing 103 a distance corresponding to the desired eventual depth of the immobile unit below the surface of the sea.

When the complete apparatus shown in Fig. 13 is planted at a selected point in the sea, the portion 98 will tend to float by reason of its inherent buoyancy. Due in part to the relative shapes of the weight 99 and the casing 103, the weight will tend to sink more rapidly than the casing, thus exerting a pull through the bridle 100 upon the brake levers 101, 101 and leaving the cable 96 free to be pulled out between the braking surfaces 105. As soon as the weight 99 reaches the bottom of the sea the pull of the bridle on the brake levers is released, and the springs 106, 106 cause the surfaces 105 to grip securely the cable 96, whereupon the further descent of the casing 103 will draw the post 98 down to a point below the surface of the sea, the depth of which point corresponds to the distance between the weight 99 and the casing 103 at the moment when the braking surfaces gripped the cable, i. e., the length of the bridle 100 and extensions thereof.

It will be seen that this method of anchoring the observation post makes it possible for the post to be used in water of any depth (which may be unknown) while the operative parts of the post will automatically assume a position at a fixed distance below the surface. It will also be evident that such a method of anchoring is useful not only in connection with the form of apparatus shown in Figs. 7, 8 and 9, but also with the form shown in Figs. 1 and 2.

Fig. 14 shows schematically the arrangement of a single fixed detection and short-wave transmission post 19 in which are combined; the listening devices of the unit 1 (Figs. 1 and 2) and the transmitting devices of the unit 4, while means for moving the post to a submerged position are omitted so that it will remain continuously at the surface of the sea.

Fig. 15 represents an alternative arrangement of the observation post, wherein the listening apparatus 1 is held motionless near the bottom, for instance by means of an anchoring cable, and is connected with the transmission unit 8 (remaining continuously at the surface) by means of an electric cable through which the variations of electric current produced by the listeners are transmitted to the transmitter.

Fig. 16 shows schematically a mobile post, similar to that in Fig. 14, in its position of underwater listening, near the sea bottom, 6' being the windlass on which the cable is wound and from which it unwinds itself in case a warning is received.

Particularly in the case of such single units as those shown in Figs. 14 and 16 (although to some extent also in the case of separate units, as in Figs. 1 to 4 and 15) it is desirable to provide a tube of considerable length between the top of the unit and the operative part of the antenna. Such a long tube will enable the antenna to project above the surface of the sea while the unit, with its listening devices, is sufficiently below the surface to be relatively undisturbed by surface noises and to be maintained in a fairly stable position regardless of any but the largest waves.

Fig. 17 represents a form of observation post in which the single unit 107 contains listening, detection and alarm apparatus adapted to actuate a bell or the like 108 for sending an acoustic signal through the water. The unit 107 is permanently anchored near the bottom of the sea or at a suitable depth, and the signals which are sent out include an identification of the post which is reporting.

It will be apparent that various changes may be made in the construction, form and arrangement of the several parts without departing from the scope of my invention and hence I do not intend to be limited to the particular embodiment herein shown and described, but what I claim is:

1. A maritime observation system of the character described comprising, a substantially immobile listening unit positioned below the surface of the sea and provided with detection means responsive to vibrations emanating from a vessel in motion, a relatively mobile transmitting unit flexibly connected to the listening unit and adapted to transmit a signal to a distant point, said transmitting unit being positioned normally below the surface of the sea, means actuated by said detection means for moving the transmitting unit to the surface of the sea for transmission of said signal, and means for moving said transmitting unit to its normal position after transmission of said signal.

2. A maritime observation system of the character described comprising, a listening unit provided with detection means responsive to vibrations emanating from a vessel in motion, means for anchoring the listening unit in relatively fixed relation to the bottom of the sea, a transmitting unit provided with wireless transmission means and positioned normally below the surface of the sea, a flexible connection between said units and having a length greater than the distance from the listening unit to the surface of the sea, electrical means actuated by said detection means for causing the transmitting unit to move to the surface of the sea, automatic means operative when the transmitting unit is at the surface of the sea to cause the wireless transmission means to send out a signal, and automatic means for moving the transmitting unit below the surface of the sea after said signal has been sent out.

3. A maritime observation system of the character described comprising, a listening unit provided with detection means responsive to vibrations emanating from a vessel in motion, means for anchoring the listening unit in relatively fixed relation to the bottom of the sea, a transmitting unit provided with wireless transmission means, positioned normally below the surface of the sea and having inherent buoyancy, a cable extending between said units, means on one of said units for winding and unwinding said cable, electrical means actuated by the detection means for causing the cable to unwind, whereby the transmitting unit is moved to the surface of the sea, automatic means operative when the transmitting unit is at the surface of the sea to cause the wireless transmission means to send out a signal, and electrical means operative after said signal has been sent out to wind said cable for moving the tranmitting unit below the surface of the sea.

4. A maritime observation system of the character described comprising, a listening unit having inherent buoyancy and being provided with detection means responsive to vibrations emanating from a vessel in motion, means for anchoring the listening unit in relatively fixed relation to the bottom of the sea and at approximately a predetermined depth below the surface thereof, a transmitting unit provided with wireless transmission means and having a variable displacement, a flexible connection between said units and having a length at least as great as the distance from the listening unit to the surface of the sea, electrical means actuated by said detection means for increasing the displacement of the transmitting unit, whereby said unit is moved to the surface of the sea, automatic means operative when said unit is at the surface of the sea to cause the wireless transmission means to send out a signal, and electrical means operative after said signal has been sent out to reduce the displacement of the transmitting unit, whereby said unit is moved below the surface of the sea.

5. A maritime observation system of the character described comprising, a listening unit having inherent buoyancy and being provided with detection means responsive to vibrations emanating from a vessel in motion, means for anchoring the listening unit in relatively fixed relation to the bottom of the sea and at approximately a predetermined depth below the surface thereof, a transmitting unit provided with wireless transmission means and having an inflatable element for varying the displacement of the unit, a supply of fluid in one of said units, a flexible connection between said units and having a length at least as great as the distance from the listening unit to the surface of the sea, electrical means actuated by the detection means for causing fluid to be supplied to the inflatable element to increase the displacement of the transmitting unit, whereby said unit is moved to the surface of the sea, automatic means operative when said unit is at the surface of the sea to cause the wireless transmission means to send out a signal, and electrical means operative after said signal has been sent out to remove the fluid from the inflatable element for reducing the displacement of the transmitting unit, whereby said unit is moved below the surface of the sea.

6. A maritime observation system according to claim 1 in which the immobile listening unit is secured in position below the surface of the sea by means of an achoring device, comprising a pilot anchor, a main anchor, a flexible connection between said anchors and having a length corresponding to the depth of said listening unit below the surface of the sea, a flexible connection between the listening unit and the main anchor, and a brake mechanism adapted to permit extension of said last named connection while both anchors are descending toward the sea bottom and to arrest such extension when the pilot anchor reaches said bottom, whereby said main anchor is caused to submerge the listening unit to its desired depth below the surface of the sea.

7. A maritime observation system of the character described comprising, detection means responsive to vibrations emanating from a vessel in motion, wireless transmission means actuated by the detection means and adapted to transmit a signal to a distant point, said transmission means being positioned normally below the surface of the sea, means for moving said transmission means to the surface of the sea for transmission of said signal, and means for moving said transmission means to its normal position after transmission of said signal, said detection mean including a listening device, a filtering device adapted to pass only impulses picked up by the listening device which correspond to vibrations emanating from a vessel in motion, and a timing mechanism adapted to activate the listening device only at predetermined intervals and for short periods of time, whereby electric current consumption is kept at a minimum consistent with the maintenance of adequate observation.

8. A maritime observation system of the character described comprising, detection means responsive to vibrations emanating from a vessel in motion, wireless transmission means actuated by the detection means and adapted to transmit a signal to a distant point, said transmission means being positioned normally below the surface of the sea, means for moving said transmission means to the surface of the sea for transmission of said signal, and means for moving said transmission means to its normal position after transmission of said signal, said transmission means including a timing mechanism adapted to determine at least a part of the signal being transmitted, whereby identification of the source of the signal transmission is facilitated.

9. A system according to claim 8 in which the timing mechanism is adapted to render inactive both the transmission means and the detection means for a predetermined period after the signal has been transmitted.

10. A maritime observation system of the character described comprising, detection means responsive to vibrations emanating from a vessel in motion, wireless transmission means actuated by the detection means and adapted to transmit a signal to a distant point, said transmission means being positioned normally below the surface of the sea, means for moving said transmission means to the surface of the sea for transmission of said signal, and means for moving said transmission means to its normal position after transmission of said signal, said transmission means including a hydrostatic pressure operated device adapted to permit the transmission of a signal only when the transmission means is at the surface of the sea.

CONSTANTIN CHILOWSKY.

REFERENCES CITED

The following references are of record in the file of this patent:

UNITED STATES PATENTS

| Number | Name | Date |
|---|---|---|
| 1,249,486 | Polachek | Dec. 11, 1917 |
| 1,195,317 | Woods | Aug. 22, 1916 |
| 1,426,337 | Sperry | Aug. 15, 1922 |
| 1,427,560 | Sperry | Aug. 29, 1922 |
| 1,430,162 | Elia | Sept. 26, 1922 |
| 1,466,284 | Harlow | Aug. 28, 1923 |
| 1,610,779 | Hewett | Dec. 14, 1926 |
| 1,749,444 | Rae | Mar. 4, 1930 |
| 1,320,610 | Elia | Nov. 4, 1919 |

FOREIGN PATENTS

| Number | Country | Date |
|---|---|---|
| 523,880 | Germany | Apr. 29, 1931 |
| 596,439 | Germany | May 3, 1934 |
| 599,586 | Germany | July 5, 1934 |